United States Patent [19]
McGuffin

[11] Patent Number: 5,272,639
[45] Date of Patent: Dec. 21, 1993

[54] TERRAIN REFERENCED NAVIGATION ELECTROMAGNETIC-GRAVITATIONAL CORRELATION

[75] Inventor: John T. McGuffin, Albuquerque, N. Mex.

[73] Assignee: Honeywell Inc., Minneapolis, Minn.

[21] Appl. No.: 821,397

[22] Filed: Jan. 14, 1992

[51] Int. Cl.$^5$ .............................................. G06F 15/50
[52] U.S. Cl. .................................... 364/449; 364/443; 364/454; 342/63; 342/64
[58] Field of Search ............... 364/443, 449, 453, 454, 364/457, 460, 571.01; 342/63, 64, 65, 450, 451, 457; 244/3.2

[56] References Cited

U.S. PATENT DOCUMENTS

| | | | |
|---|---|---|---|
| 4,144,571 | 3/1979 | Webber | 342/63 |
| 4,520,445 | 5/1985 | Keearns | 364/454 |
| 4,584,646 | 4/1986 | Chan et al. | 364/443 |
| 4,829,304 | 5/1989 | Baird | 342/63 |
| 4,939,663 | 7/1990 | Baird | 364/449 |
| 5,086,396 | 2/1992 | Waruszewski, Jr. | 364/454 |
| 5,184,304 | 2/1993 | Huddle | 364/453 |

OTHER PUBLICATIONS

The proceedings of the IEEE National Aerospace and Electronics Conference—NAECON, May 20–24, 1985 entitled *The AFTI/F16 Terrain-Aided Navigation System*, by D. D. Boozer, M. K. Lau, J. R. Fellerhoff, Sandia National Laboratories, Albuquerque, N.M. 87185, pp. 351–357.
Eric Skarman of SAAB Scandia AB Aerospace Division in a paper entitled *Kalman Filter for Terrain-Aided Navigation*, pp. 25.1–25.10.
Charles A. Baird and Mark R. Abramson in a paper entitled *A Comparison of Several Digital Map-Aided Navigation Techniques*, 1984, IEEE Journal, pp. 286–293.
J. R. Fellerhoff in a paper entitled *SITAN Implementation in the Saint System*, 1986, IEEE Jouranl, pp. 89–95.
Carlos A. Bedoya in a paper entitled *Terrain Aided Navigation Algorithms Survey*, McDonnell Douglas Company B0697, Oct. 31, 1987, pp. 1–38.
Larry D. Hostetler and Ronald D. Andreas in a paper entitled *Nonlinear Kalman Filtering Techniques for Terrain-Aided Navigation*, IEEE Transactions on Automatic Control, vol. AC-28, No. 3, Mar. 1983, pp. 315–323.

Primary Examiner—Gary Chin
Attorney, Agent, or Firm—Ronald E. Champion; Craig J. Lervick

[57] ABSTRACT

A terrain reference navigation system for an aircraft, surface vessel or subsurface vessel utilizing three sets of geo-physical correlation data. A kalman filter is used to correlate terrain data, electromagnetic data and gravimetric data with the output of a digital map of terrain, electromagnetic field and gravity. An optical disk stores the digitized data for sections of the globe. A Best of 3 selection process decides based on the errors in the kalman filter whether to accept the prediction of the terrain system, electromagnetic system or gravity system. An inertial navigation system uses the results of the Best of 3 selection to update aircraft, surface vessel or sub-surface vessel position and velocity and provide a more accurate positional estimate.

12 Claims, 3 Drawing Sheets

TERRAIN REFERENCED NAVIGATION ELECTROMAGNETIC-GRAVITATIONAL CORRELATION

BACKGROUND OF THE INVENTION

I. Field of the Invention

This invention relates to a method of reducing the amount of uncertainty in a terrain referenced navigation system while flying over water, flat ground or shifting desert and dunes and more particularly to a method of correlating electromagnetic and gravimetric information relative to the flight path of an aircraft under direction of a terrain referenced navigation system.

II. Background of Terrain Referenced Navigation

One prior art terrain aided navigation system is available from Sandia Labs. Sandia has created the Sandia Inertial Terrain-Aided Navigation (SITAN) flight-computer algorithm that produces a very accurate trajectory for low-flying, high-performance aircraft by combining outputs from a radar or laser altimeter, an inertial navigation system (INS), and a digital terrain elevation map. SITAN is a recursive, real time, terrain-aided navigation algorithm for use on fighter aircraft. The algorithm has been implemented in a popular microprocessor. The aircraft's position can be estimated within a 926 meter circle error of probability. A good description of the SITAN terrain aided navigation system can be found in the proceedings of the IEEE National Aerospace and Electronics Conference—NAECON, May 20-24, 1985 entitled The *AFTI/F16 Terrain-Aided Navigation System*, by D. D. Boozer, M. K. Lau, J. R. Fellerhoff, Sandia National Laboratories, Albuquerque, N. Mex. 87185.

SITAN utilizes Kalman filter algorithms to process geophysical measurements. The algorithm estimates errors in a flight path produced by an inertial navigation system following the equations given in the above-mentioned article quoted below.

"The Kalman filter can be formed with the following state model and measurement:

$$\delta X_{k+1} = \phi \delta X_k + W_k$$

$$C_k = C(X_k) + V_k$$
$$= Z_k - h(.,.) + V_k$$

wherein:
$\delta X_k$ = INS error states to be estimated
$\phi$ = state-transition matrix for INS errors
$X_k$ = states of INS and aircraft
$C_k$ = ground clearance measurement
$Z_k$ = altitude of aircraft
h = height of terrain at position ( ., . )
$W_k$ = driving noise with $E(W_k) = 0$ for all k and $E(W_k W_j^T) = Q_k \delta kj$
$V_k$ = measurement error With $E(V_k) = 0$ for all k and $E(V_k V_j) = R_k \delta kj$
k = Subscript denoting time k.

Since the measurement function c(x) is a nonlinear function of the states, the standard extended Kalman filter approach is used to obtain the measurement matrix, $$H_k = \frac{\partial c(X)}{\partial X} | X = X_k(-) = [-h_x, -h_y, 1, 0, 0 \ldots]$$

where $h_x$ and $h_y$ are the terrain slopes in the x and y directions of the map evaluated at $X_k(-)$, the predicted aircraft position just before a measurement is processed at time k. The first three states are taken to be the x position, y position, and altitude, respectively. At any time k, $$X = X_{INS} + \delta X$$

The state vector often used in a single filter implementation is $$\delta X = [\delta X \; \delta Y \; \delta Z \; \delta V_x \; \delta V_y]^T$$

where $\delta X$, $\delta Y$, $\delta Z$, $\delta V_x$, and $\delta V_y$ are errors in the X position, Y position, altitude, X velocity, and Y velocity, respectively. Other INS errors and states can also be included in $\delta X$ by using the proper $\phi$.

Parallel SITAN was developed because the distance needed by SITAN to reach steady state becomes excessive as initial position errors (IPEs) approach several hundred meters. Parallel SITAN is a bank of extended Kalman filters that process identical altimeter measurements. After some updates, the filter with the minimum average weighted residual squared (AWRS) value is identified as having the correct position estimate. The AWRS value is defined by $$AWRS_{jth\;filter} = \frac{1}{n} \left[ \sum_{i=1}^{n} \frac{\Delta_i^2}{H_i P_i H_i^T + R_i} \right]_{jth\;filter}$$

where $\Delta_i$ is the residual at ith update, n is the number of updates, and $HPH^T + R$ is the residual variance. Once the IPEs are reduced by the parallel filters, a single filter performs well, starting off essentially in steady state.

To implement parallel SITAN, the number and geometrical layout of the parallel filters needed to cover an IPE must be specified. A square, constant-spaced grid can be used to center the filters about the horizontal position indicated by the INS. Filters at and near the corners are then eliminated to reduce the number of filters. To further lighten the computational burden, three-state, instead of five-state, filters are often used in parallel SITAN with $$\delta X = [\delta X \; \delta Y \; \delta Z]^T$$

For both the single and parallel filter implementation's least-squares plane fit to the map, known as stochastic linearization, is used to compute the slopes, $h_x$ and $h_y$. Horizontal uncertainties $\sigma_X$ and $\sigma_Y$ from the error-covariance matrix, defined by and are used to determine the size of the plane. Residuals $$P = E[(\delta X - \hat{\delta X})\;(\hat{\delta X} - \hat{\delta X})^T]$$
$$\text{Diag } P = [\sigma_X^2 \; \sigma_Y^2 \; \sigma_Z^2 \; \sigma_{Vx}^2 \; \sigma_{Vy}^2]$$

from the plane fit, $RFIT_k$, are added to the measurement error variance, $R_k$, to ensure that the SITAN filter assigns less weight to the measurement when the plane fit is either very large or is over a rough area, thus adapting to local terrain."

SITAN has three basic modes: acquisition mode, lost mode and track mode.

Acquisition Mode

The information from the inertial navigation position is used. When one of the 57 filters identifies a reliable estimate of true aircraft position, the track mode is entered. A single five state Kalman filter is initialized at the estimated acquired position. During track mode, the aircraft's position is estimated every 100 meters. SITAN employs a mode control logic concept to handle the transition from track to lost and from acquisition to track.

Acquisition mode is used to locate the aircraft's position within a circular region of uncertainty. The region of uncertainty is called the circular error of probability or CEP. In SITAN a 2100 meter initial position CEP is covered with 57 3-state Kalman filters centered on a grid whose initial positions are 525 meters apart.

The state acquisition filters include error states. They can estimate an aircraft's position under significant INS velocity errors. Each filter is initialized with position error estimates. To ensure that erroneous information is not employed to update the filters, none of the filters are updated if the pitch altitude is greater than 30 degrees or if the altimeter loses lock or the INS fails.

If the mode control logic of SITAN indicates that the aircraft has deviated from the 2363 meter search area, the lost mode is initiated. The lost mode ceases to provide position estimates for the aircraft, and the pilot has to update the inertial navigation before restarting SITAN.

Track Mode

Track mode estimates the position of the aircraft during flight. The five state tracking filter is used. The acquisition mode initializes the track filters. The track mode makes estimates of terrain slopes in rectangles surrounding the center of the aircraft position. The track filters are not updated during track mode unless the inertial navigation system, altimeter, and other flight data are valid.

Track mode is entered when the aircraft's actual position is close to the estimated one. In the event of a false fix, the track filter is set at the wrong position and the SITAN algorithm will proceed as if it was correct. This produces large errors in estimated positions. It is imperative that the probability of a false fix be kept low. The following is taken from the above-mentioned article in regard to the mode control logic of SITAN.

With the design for the acquisition, lost, and track modes as described above, the mode-control logic (FIG. 6) is needed to determine in which mode the algorithm should operate. When large aircraft position errors exist, it should choose the acquisition mode; with small errors, the track. The main parameter used in the mode-control logic for transition from acquisition to track is the AWRS. FIG. 7 shows a cross-section of a three-dimensional AWRS surface where AWRS is a function of the parallel filter positions $(X_j, Y_j)$. In the acquisition mode the parallel filters will tend to migrate to the relative minima of this surface.

To keep the parallel filters from migrating too far from their initial positions, a maximum of 128 updates is allowed. Four tests are performed after every 32 updates to determine if transition to the track mode is possible by selecting the acquisition filter with the minimum AWRS. Test 1 requires the selected filter to have an AWRS lower than a threshold value to ensure that the parallel filters are indeed over the correct aircraft position. If the parallel filters are configured over an area which does not include the true aircraft position, the global minimum of the AWRS curve is expected to shift upward. Test 2 requires contrast in the terrain, a sufficient different between $AWRS_{min}$ and $AWRS_{max}$ to prevent transition to the track mode over very smooth areas such as water. Test 3, the false-fix test, requires that the minimum AWRS outside of an exclusion region, $AWRS^*_{min}$ does not compete with $AWRS_{min}$, where the size of the exclusive region is computed using $\sigma_x$ and $\sigma_y$ of the selected filter. Statistically, as more updates are made, the separation between the global minimum and relative minima can be realized and still retain the same confidence level. Therefore, the required separation between $AWRS^*_{min}$ and $AWRS_{min}$ should be a function of $1/n$, where n is the number of updates. Test 4 requires the $\sigma_x$ and $\sigma_y$ of the selected filter to be smaller than its initial value, 200 m, indicating that improvements have been made in estimating the aircraft's position during acquisition.

If track is not entered after 128 updates, a test for the lost mode is made. If $AWRS_{min}$ is greater than a threshold, the lost mode is entered and AFTI/SITAN will not produce any more estimates until the pilot updates the INS, which will automatically restart AFTI/SITAN in the track mode. If the lost condition is not met, the parallel filters are reset and acquisition starts over. This process continues until track or lost mode is entered. Once in track, the track filter's $\sigma_x$ and $\sigma_y$ are checked continuously while its AWRS is checked every 64 updates. If either the $\sigma$'s or the AWRS is too high, AFTI/SITAN switches back to the acquisition mode. The test on $\sigma$ prevents the track filter from using excessively large plane fits to maintain track after flying over smooth terrain for a long time. The AWRS test checks for unbelievable filter residuals. The entire mode-control logic with parameter values derived from the South Central flight test data is shown in FIG. 6.

Discussion of the Prior Art

Terrain aided navigation is a concept which has had industry application since the Cruise Missile development. The fundamental assumption in terrain aided navigation is that the 'terrain elevation profile' under an aircraft's flight path is sufficiently unique to allow one to determine the position of the aircraft with an accuracy which is much better than a typical inertial navigation system (INS). This is only true, of course, if the terrain under the flight path of the aircraft is not flat and you have an accurate map of the flight path in terms of elevation.

Now referring to FIG. 1 which shows a generalized terrain aided navigation system. In general, terrain aided navigation systems utilize a barometric altimeter 20 to obtain aircraft elevation data 22 and a down-looking radar or laser altimeter 26 to obtain aircraft ground clearance information 24. The ground clearance data 24 is then subtracted using a subtractor 23 from the aircraft elevation 22 to obtain an estimate of the elevation of the terrain 28 which is below the aircraft. Residuals from the plane fit 34 of the Kalman filter are added to the measurement error 32 to ensure that the filter assigns less weight to the measurement when the plane fit is either very large or is over a rough area, thus adapting to local terrain. The elevation data 17 is then subtracted using a subtractor 16 from the associated map terrain elevation data 14 for that latitude/longitude 12 and the resulting error 32 is used with INS position 12 and velocity data in a Kalman Filter 30 to produce estimated aircraft position updates 36 and velocity updates 38 to the INS.

Inertial Navigation Systems (INS) have inherent inaccuracies which lead to positional uncertainties when flying using INS. Even terrain aided algorithms have difficulty with certain physical terrain characteristics. Terrain Profile Matching algorithms matched radar/barometer altimeter data to an on-board digital elevation data base using auto-correlation techniques to determine aircraft position in real-time. This technique works only over terrain with a relatively uniquely defined profile and not an ambiguous profile such as over flat land and water.

Alternate navigation aids such as the Global Positioning System (GPS) might not exist in a war environment.

A better positional determination system is needed to overcome the difficulty of the Prior Art. Such is the motivation of this present invention.

SUMMARY OF THE INVENTION

The invention proceeds by employing auto-correlation techniques in conjunction with terrain data when the aircraft is over land, and used with other geophysical data such as geo-magnetic or gravimetric when not over land or over flat land. Simultaneous/parallel auto-correlation of two data bases reduces the positional uncertainty because more than one type of data is available in the flight path.

It is an object of the invention to provide an improved terrain aided navigation system that uses the auto-correlation of a plurality of geophysical characteristic databases to improve the accuracy of the terrain aided navigation system.

It is an object of the invention to provide an improved terrain aided navigation system that uses an electromagnetic data base and a gravimetric data base that is stored on a magnetic or optical disc.

It is an object of the invention to provide an improved terrain aided navigation system that is usable over flat land, bodies of water and deserts.

It is an object of the invention to provide an improved terrain aided navigation system that uses a simultaneous and parallel auto-correlation of a electromagnetic and gravimetric data bases.

It is an object of the invention to provide an improved terrain aided navigation system that allows an aircraft to know where it is after coast fall.

It is an object of the invention to provide an improved terrain aided navigation system that uses a Best of 3 selection algorithm that chooses a velocity update and position update either from one of three Kalman filters, the first being a terrain correlation Kalman filter, the second being a electromagnetic correlation Kalman filter and the third being a gravity correlation Kalman filter.

It is an object of the invention to provide an improved terrain aided navigation system that selects either the electromagnetic correlation Kalman filter or the gravimetric correlation Kalman filter when the terrain correlation Kalman filter indicates a "flat" condition.

It is an object of the invention to also provide surface or subsurface ships with a method of navigation utilizing ocean bottom terrain, gravity data bases and electromagnetic data bases, with the related sensors.

It is a further object of the invention to provide a passive system that uses an electromagnetic sensor and electromagnetic data base or a gravity sensor and gravity data base.

BRIEF DESCRIPTION OF THE DRAWINGS

To illustrate this invention, a preferred embodiment will be described herein with reference to the accompanying drawings. The preferred embodiment concerns the auto-correlation of a gravimetric and electro-magnetic database to improve the accuracy of a terrain referenced navigation system.

DESCRIPTION OF THE PREFERRED EMBODIMENT

Inherent in any approach of this type is the need for basic data concerning the electro-magnetic characteristics of the terrain of interest to navigate and the gravitation profile of the same terrain. The National Geophysical Data Center has available electro-magnetic and gravitational data for extensive portions of the globe, including broad ocean areas. The electro-magnetic and gravitational profiles are available in digital, machine readable form, in much the same way that terrain elevation data is available for extensive portions of the globe.

Figure 1:
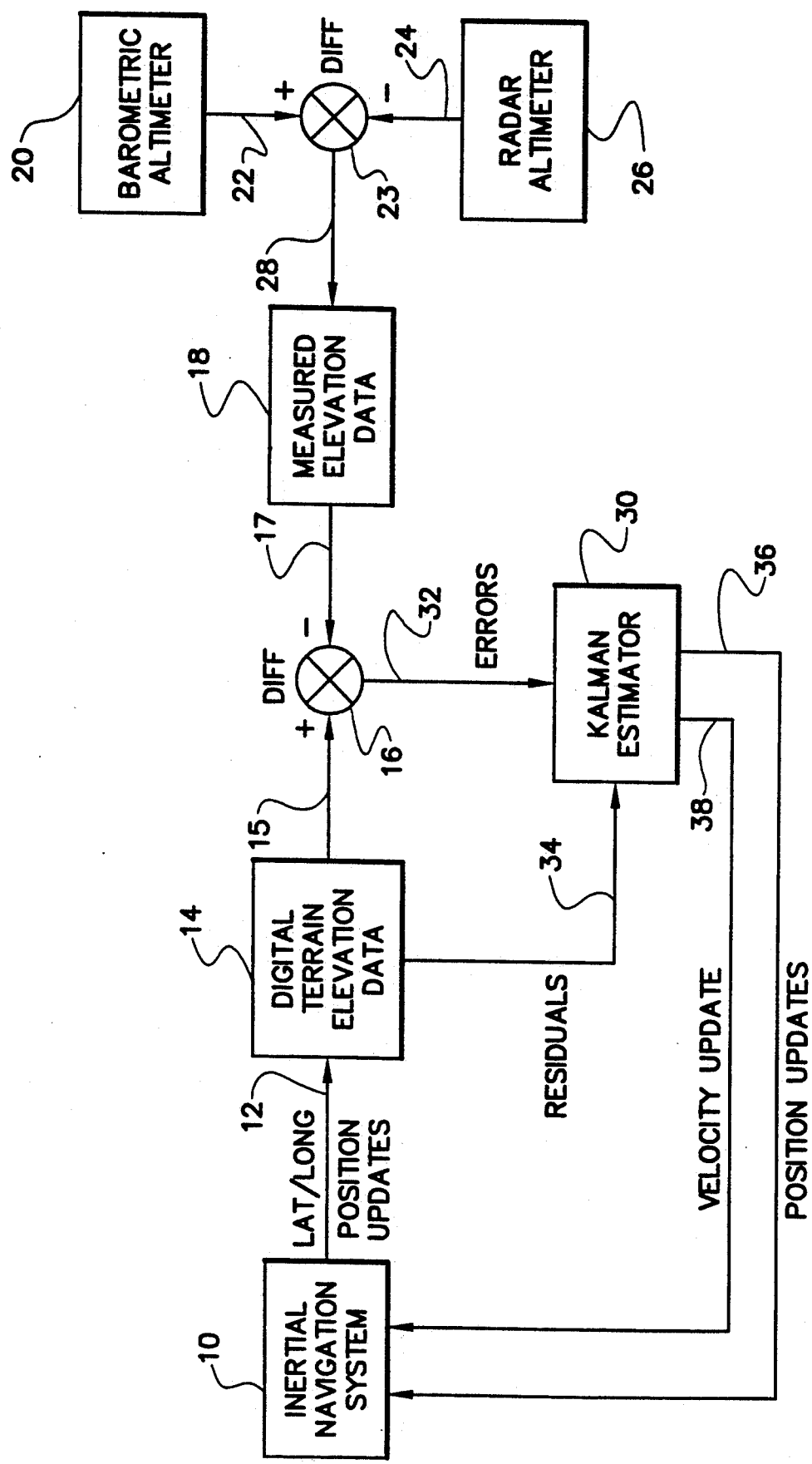
FIG. 1 shows a schematic flow block diagram of the generalized terrain aided navigation system structure of the prior art.
Figure 2A:
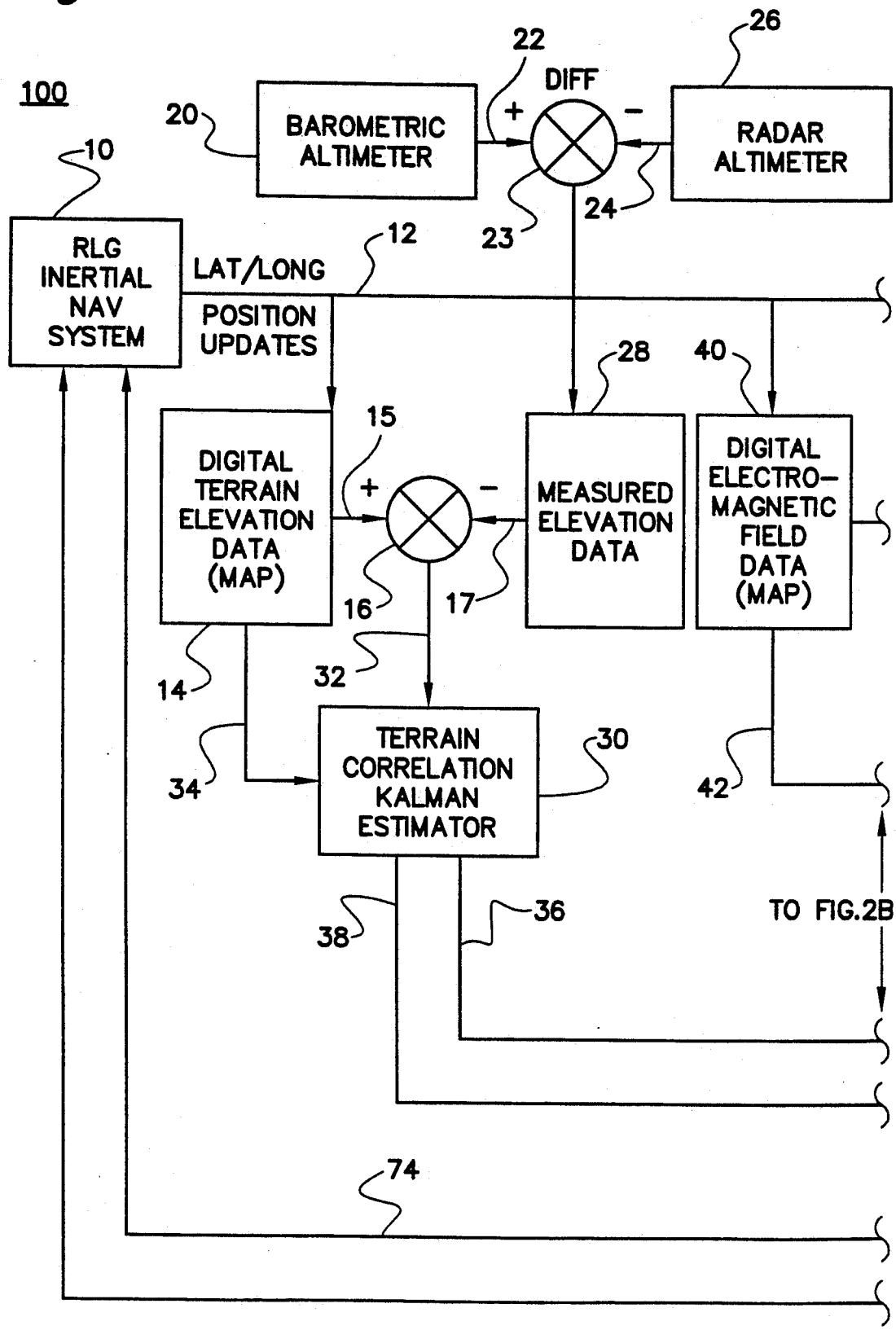
FIG. 2 shows a schematic flow diagram of one embodiment of the auto-correlated electro-magnetic and gravimetric method and apparatus of the invention.
Figure 2B:
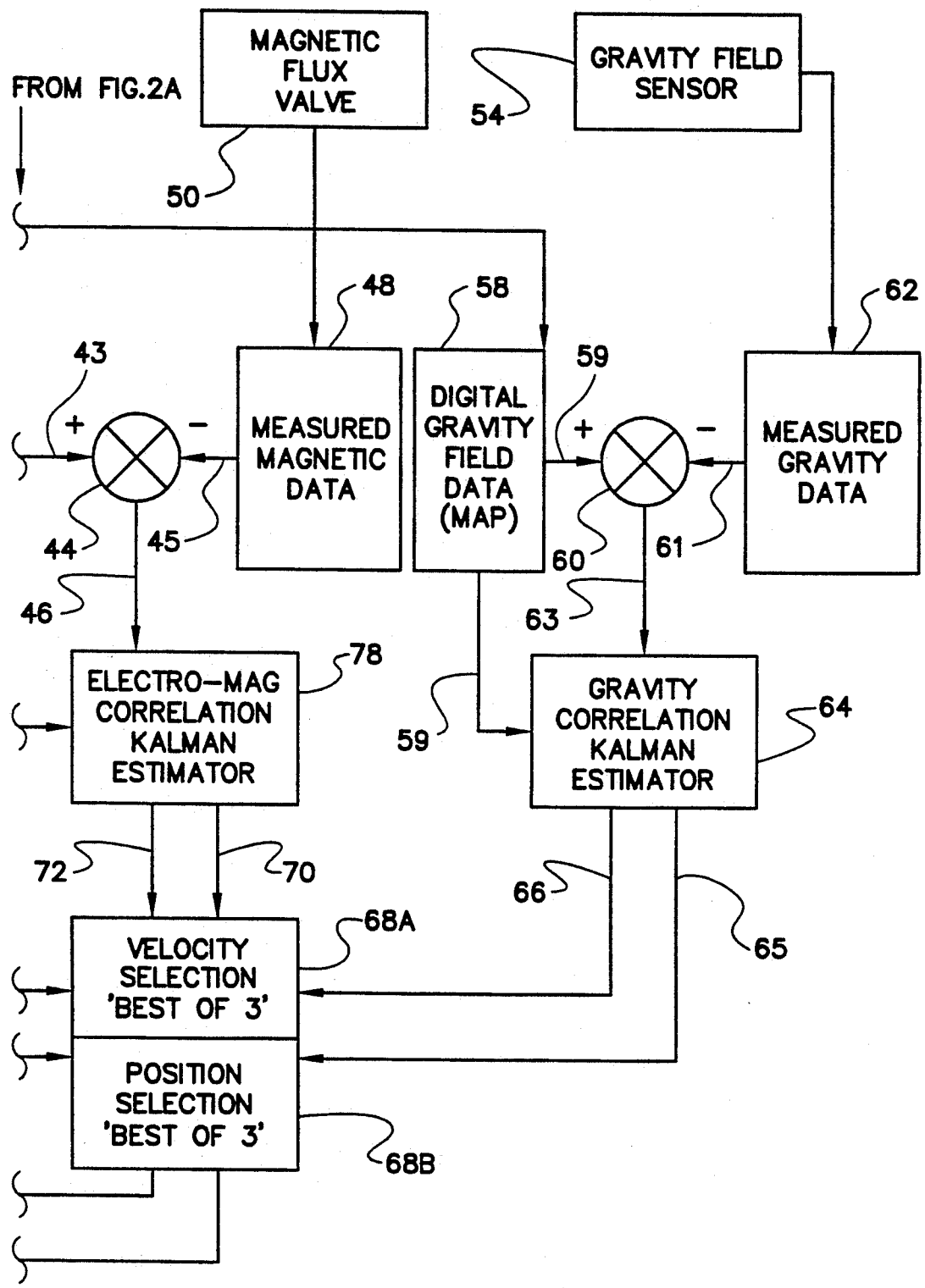

Now referring to FIG. 2 which shows the preferred embodiment of the method and apparatus of the invention. As in the general case, the preferred terrain aided navigation invention utilizes a barometric altimeter 20 to obtain aircraft elevation data 22 and a down-looking radar or laser altimeter 26 to obtain aircraft ground clearance information 24. The ground clearance data 24 is then subtracted using a subtractor 23 from the aircraft elevation 22 to obtain an estimate of the elevation of the terrain 28 which is below the aircraft. Residuals from the plane fit 34 of the Kalman filter are added in a well known manner to the measurement error 32 to ensure that the filter assigns less weight to the measurement when the plane fit is either very large or is over a rough area, thus adapting to local terrain. As with the prior art elevation data 17 is then subtracted using a subtractor 16 from the associated map terrain elevation data 15 for that latitude/longitude 12 and the resulting error 32 is used with INS position 12 and velocity data in a Kalman Filter 30 to produce estimated aircraft position updates 38 and velocity updates 36 to a Best of 3 selection blocks 68A and 68B.

Electro-magnetic field data is handled the same way as terrain profile data. In one preferred terrain aided navigation embodiment of the invention an electro-magnetic field sensor 50, for example a magnetic flux valve, is used to obtain measured electro-magnetic field data 48. In this case residuals from the plane fit 42 of the Kalman filter for the digital electro-magnetic field map 40 are added to the measurement error 46 to ensure that the filter assigns less weight to the measurement when the plane fit is either very large or is over a rough area, thus adapting to local variations in electro-magnetic field. The measured electro-magnetic field data 45 is then subtracted using a subtractor 44 from the associated digital electro-magnetic field data map data 43 for that latitude/longitude 12 and the resulting error 46 is used with INS position 12 and velocity data in a electro-magnetic correlation Kalman Filter 78 to produce estimated aircraft position updates 72 and velocity updates 70 to a Best of 3 selection blocks 68A and 68B.

Gravity field data is handled the same way as terrain profile data. In one terrain aided navigation embodiment of the invention a gravity field sensor 54 is used to obtain measured gravity field data 62. In this case residuals from the plane fit 59 of the Kalman filter for the digital gravity field map 58 are added to the measurement error 63 to ensure that the filter assigns less weight to the measurement when the plane fit is either very large or is over a rough area, thus adapting to local variations in gravity. The measured gravity data 61 is then subtracted using a subtractor 60 from the associated digital gravity field data map data 59 for that latitude/longitude 12 and the resulting error 63 is used with INS position 12 and velocity data in a gravity correlation Kalman Filter 64 to produce estimated aircraft position updates 65 and velocity updates 66 to a Best of 3 selection blocks 68A and 68B.

The Best of 3 selection blocks 68A and 68B choose which of the three sets of updates to send to the inertial navigation system 10, such as a ring laser gyro (RLG) based inertial navigation system. The information provided for a selected velocity update 74 is either the terrain correlated kalman estimate of the velocity update 36 or the electro-magnetic correlated kalman estimate of the velocity update 70 or the gravity correlated kalman estimate of the velocity update 66. The information provided for a selected position update 76 is either the terrain correlated kalman estimate of the position update 38 the electro-magnetic correlated kalman estimate of the position update 72 or the gravity correlated kalman estimate of the position update 65. In either case the system tries to provide a best estimate of position with respect to the all three types of data.

Those skilled in the art will recognize that the digitized terrain elevation data map 14, digitized electro-magnetic field data map 40 and digitized gravity field data map 58 may be stored in a magnetic or optical storage system.

The Best of 3 selection blocks 68A and 68B recognize when the terrain Kalman filter 30 is over water, flat ground or deserts and utilizes the results of the other two filters 78 and 64 for these cases. Selection block 68A chooses the best velocity update and selection block 68B chooses the best position update. Similarly the other two filters 78 and 64 may have similar problems when there is insufficient data of their type in the flight path and would similarly be excluded from selection for inertial navigation system 10 updates 74 and 76. For example the terrain filter 30 could be reporting a flat condition in which case either the electro-magnetic filter 78 could be used or the gravity filter 64 could be used depending on which filter is reporting the lowest error or is not also in a substantially flat condition. When the terrain correlation filter returns to a non-flat condition the terrain updates 36 and 38 are utilized again.

The method of the invention provides a number of supplemental predictions to help eliminate the problem with flying over flat ground, water and deserts, since gravimetric 61 and electromagnetic data 45 is not correlated to terrain elevation data 17. Even though desert sands move and water remains about the same elevation, the gravimetric data 61 and electromagnetic data 45 is unique and relatively stable.

The three types of navigation aids provided by the invention provide a capability of looking ahead and predicting the aircraft's impending position with respect to terrain and provide ground proximity warning before the aircraft and terrain elevation become coincident. An audible signal could be generated to alert the pilot of imminent ground intercept.

Those skilled in the art will recognize that the approach of the invention could be utilized for underwater terrain aided navigation for underwater and surface craft as charts of underwater terrain elevation are available. The capability to operate in broad ocean areas, flat ground, and deserts is a significant improvement over the prior art.

Electromagnetic sensor and electromagnetic data base or a gravity sensor and gravity data base is used the system is passive, in the sense that no detectable radiation in generated, whereas the terrain database requires a random altimeter which is not passive.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A terrain referenced navigation system for use in an aircraft comprising:
    (a) a means for determining a current terrain elevation from the aircraft having a current terrain elevation output;
    (b) a means for determining a current electromagnetic field from the aircraft having a current electromagnetic field output;
    (c) a means for detecting a current gravity field from the aircraft having a current gravity field output;
    (d) a means for inertial navigation having a latitude/longitude positional output, a selected position update input and a selected velocity update input;
    (e) a means for storing a digital terrain elevation map having a terrain latitude/longitude input connected to the latitude/longitude positional output and having a digital terrain elevation residual output and a digital terrain elevation output wherein the means for storing a digital terrain elevation map provides the digital terrain elevation residual output and digital terrain elevation output in response to the terrain latitude/longitude input;
    (f) a means for computing the difference between elevations connected to the current terrain elevation output and the digital terrain elevation output, wherein the means for computing the difference between elevations also includes a terrain error output;
    (g) a means for storing a digital electromagnetic field map having a electromagnetic latitude/longitude input connected to the latitude/longitude positional output and a digital electromagnetic field residual output and a digital electromagnetic field output wherein the means for storing a digital electromagnetic field provides the digital electromagnetic residual output and digital electromagnetic field output in response to the electromagnetic latitude/longitude input;

(h) a means for subtracting a digital electromagnetic field connected to the digital electromagnetic field output and the current electromagnetic field output and wherein the means for subtracting a digital electromagnet field also includes a electromagnetic error output;

(i) a means for storing a gravity field map having a gravity latitude/longitude input connected to the latitude/longitude positional output and having a gravity field residual output and a gravity field output wherein the means for storing a gravity field map provides the gravity field residual output and gravity field output in response to the gravity latitude/longitude input;

(j) a means for subtracting a gravity field connected to the gravity field output and the current gravity field output and wherein the means for subtracting a gravity field also includes a gravity error output;

(k) a means for terrain correlation connected to the digital terrain elevation residual output and the terrain error output and wherein the means for terrain correlation provides a terrain velocity update and a terrain position update;

(l) a means for electromagnetic correlation connected to the digital electromagnetic elevation residual output and the electromagnetic error output and wherein the means for electromagnetic correlation provides a electromagnetic velocity update and a electromagnetic position update;

(m) a means for gravity correlation connected to the digital gravity elevation residual output and the gravity error output and wherein the means for gravity correlation provides a gravity velocity update and a gravity position update;

(n) a means for selecting between the terrain velocity update, the electromagnetic velocity update and the gravity velocity update to provide a selected velocity update wherein the selected velocity update is connected to the selected velocity update input; and (o) a means for selecting between the terrain position update, the electromagnetic position update and the gravity position update to provide a selected position update wherein the selected position update is connected to the selected position update input.

2. The terrain referenced navigation system of claim 1 wherein the means for terrain correlation is a kalman filter.

3. The terrain referenced navigation system of claim 1 wherein the means for electromagnetic correlation is a kalman filter.

4. The terrain referenced navigation system of claim 1 wherein the means for gravity correlation is a kalman filter.

5. The terrain referenced navigation system of claim 1 wherein the means for selecting between the terrain velocity update, the electromagnetic velocity update and the gravity velocity update selects the update with the least error.

6. The terrain referenced navigation system of claim 1 wherein the means for selecting between the terrain position update, the electromagnetic position update and the gravity position update selects the update with the least error.

7. The terrain referenced navigation system of claim 1 wherein the means for determining a current terrain elevation from the aircraft further comprises a barometric altimeter and a radar altimeter wherein the current terrain elevation is calculated from the difference between the barometric altimeter and the radar altimeter.

8. The terrain referenced navigation system of claim 1 wherein the means for determining the current electro-magnetic field from the aircraft further comprises a magnetic flux valve.

9. The terrain referenced navigation system of claim 1 wherein the means for detecting a gravity field from the aircraft comprises a gravitometer.

10. The terrain referenced navigation system of claim 1 wherein the means for inertial navigation further comprises a laser gyro inertial navigation system.

11. The terrain referenced navigation system of claim 1 wherein the means for storing a digital terrain elevation map further comprises an optical disk.

12. The terrain referenced navigation system of claim 1 wherein the means for storing a digital electromagnetic field map further comprises an optical disk.

* * * * *